(12) United States Patent
Lin (10) Patent No.: US 6,397,733 B1
(45) Date of Patent: Jun. 4, 2002

(54) FOOD ROASTER

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 0 days.

(21) Appl. No.: 09/900,871

(22) Filed: Jul. 10, 2001

(51) Int. Cl.[7] .......................... A47J 37/00; A47J 37/06; A47J 37/10; H05B 1/00; H05B 3/06
(52) U.S. Cl. .............................. 99/375; 99/380; 99/400; 99/425; 99/446; 219/386; 219/521; 219/524
(58) Field of Search ........................... 99/372–384, 400, 99/401, 425, 444–450; 219/401, 524, 525, 521, 415, 386, 461; 126/369, 20; 425/523

(56) References Cited

U.S. PATENT DOCUMENTS

| | | | | |
|---|---|---|---|---|
| 4,011,431 A | * | 3/1977 | Levin ........................ | 99/446 X |
| 5,363,748 A | * | 11/1994 | Boehm et al. ................. | 99/372 |
| 5,615,604 A | * | 4/1997 | Chenglin ..................... | 99/332 |
| 5,845,562 A | * | 12/1998 | Deni et al. ..................... | 99/375 |
| 5,848,567 A | * | 12/1998 | Chiang ........................ | 99/375 |
| 6,016,741 A | * | 1/2000 | Tsai et al. ................. | 99/400 X |
| 6,170,389 B1 | * | 1/2001 | Brady .......................... | 99/332 |
| 6,269,738 B1 | * | 8/2001 | Huang .......................... | 99/375 |
| 6,276,263 B1 | * | 8/2001 | Huang .......................... | 99/375 |

* cited by examiner

Primary Examiner—Timothy F. Simone
(74) Attorney, Agent, or Firm—Bacon & Thomas, PLLC (57) ABSTRACT

A food roasting apparatus has a roasting main body and an upholding device is mounted on the roasting main body at the far end with respect to the oil-collected hole. The upholding device includes an upholding element and a covering body, which can shield the upholding element and can be locked at a bottom of the roasting main body. The upholding element has a pulling rod part. Two ends of the pulling rod part are forwardly bent to form a crossing part. The end of the crossing part is again inwardly bent to form a stopping part. With respect to the crossing part, the roasting main body and the cover body both has indentations for crossing over.

2 Claims, 8 Drawing Sheets

FOOD ROASTER

BACKGROUND OF THE INVENTION (a) Field of the Invention

The present invention is to provide a food roasting plate, and more particularly, to a structure of a food roasting plate that has a function to easily lead and collect oil in roasting.

(b) Description of the Prior Art

For the structure of a commonly seen food roaster, it usually is formed with two symmetrical outer covering plates, of which one serves as a base and another one serves as an upper cover. When the outer covering plate of the upper cover is open, the inner part of the two outer covering plates both function as a roasting surface. A heater, preferably such as electric heating type, is formed between the roasting surface and the outer covering plate. In this manner, the roasting surface can collect heat, and thereby the food to be roasted can be disposed on the roasting surface. Therefore, when the two roasting surface are pressed to each other for close, that is, the two outer covering plate are pressed for close, it can achieve the object of roasting food.

In general, the roasting surface of the food roasting plate has a protruding rib structure, so that the adjacent sides of the protruding rib on the roasting surface form an oil drainage channel with a relative low position, which is allows the oil dripped from the food can fall on the oil drainage channel for downward collection. Then, an oil-collected hole is formed at the lowest location of the roasting plate for oil collection. An oil basin is disposed below the oil-collected hole. The oil flowing from the drainage channel to the oil-collected hole, and then the oil can be collected at the oil basin and is dumped.

However, even though the usual drainage channel formed on the roasting surface of the food roaster has a sloping surface so as to allow the oils to be gradually drained out, but the slop is not large. Therefore, when the user accomplishes the use for roasting, he usually needs to pull up a corner, which is not the corner for collecting oil, so as to make the oil from the roasting surface can easily and fast flow through the drainage channel to the collection hole, resulting in the easy collection of oil to the collection basin. Clearly, the conventional food roasting plate has poor design in draining oil fluently and is inconvenient for use. The improvement is necessary.

SUMMARY OF THE INVENTION

Therefore, the inventor has considered and developed to effectively improve the present invention.

Therefore, the primary object of the invention is to provide a food roaster, which can easily and fast conduct the oil for collection, whereby it can be more convenient and safer in use.

DETAILED DESCRIPTION OF THE PREFERRED EMBODIMENTS

Figure 1:
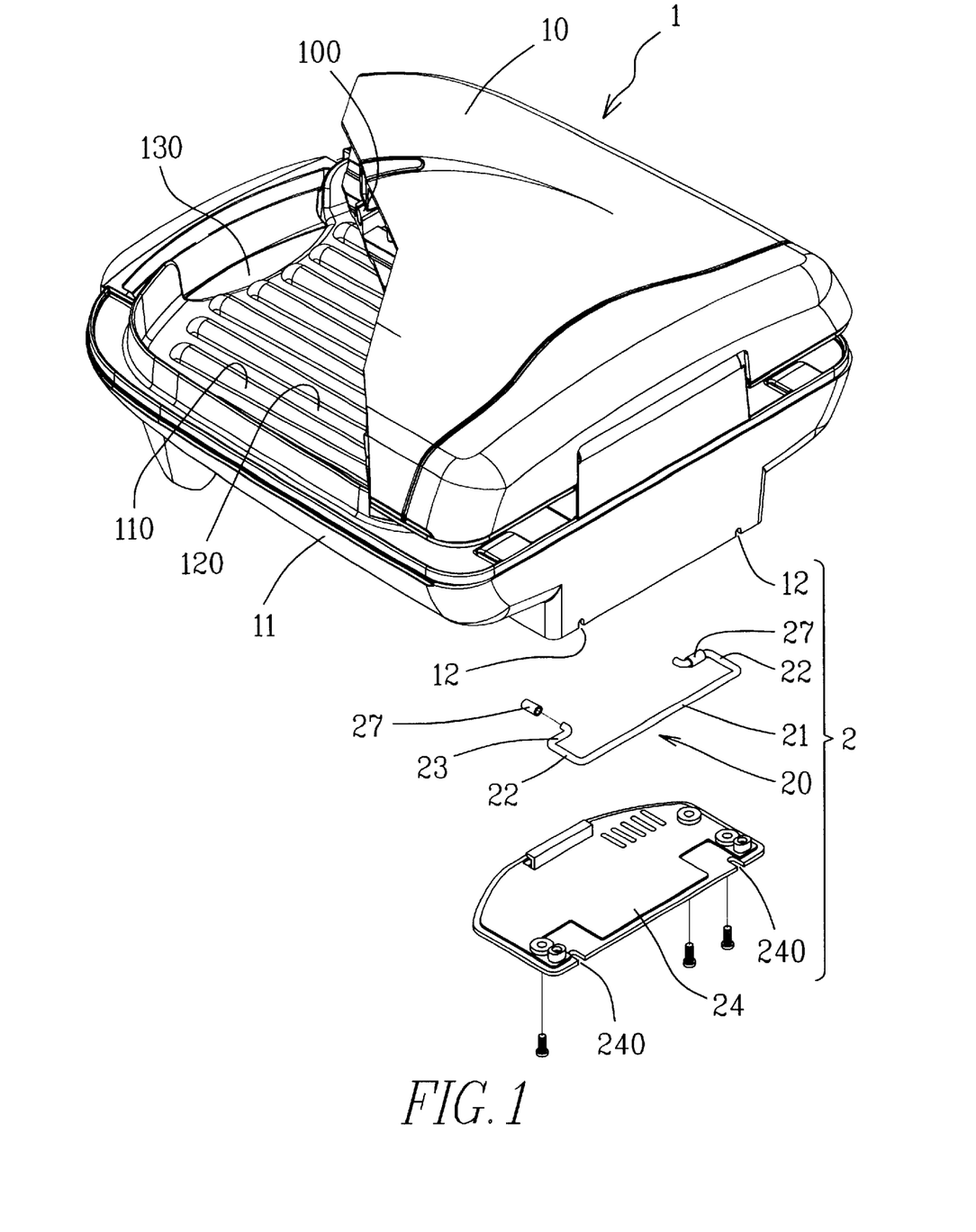
FIG. 1 is a perspective view of dissection, schematically showing a part of the food roasting plating, according to a preferred embodiment of the invention.
Figure 2:
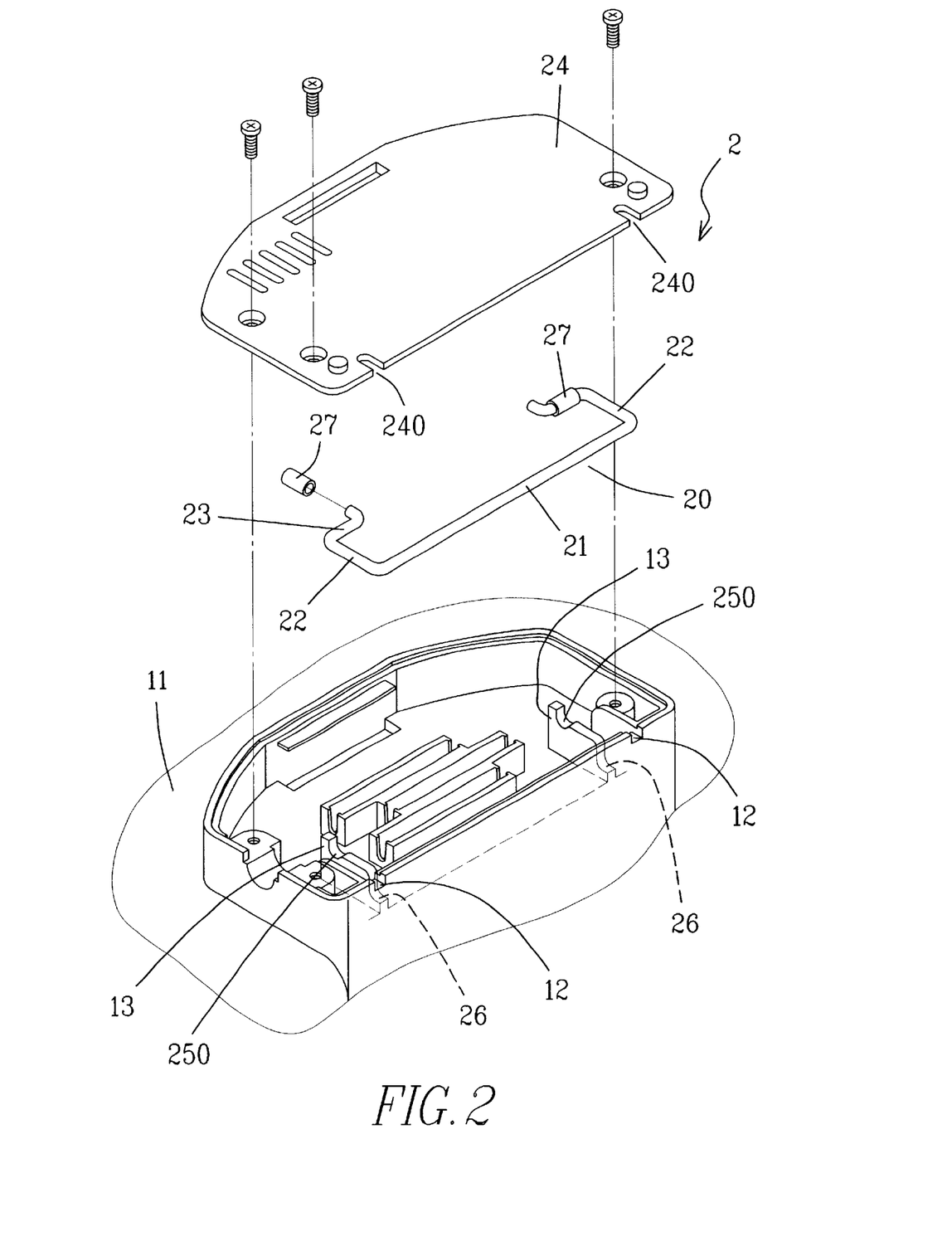
FIG. 2 is a perspective view of dissection, schematically showing a part of the food roaster plate, which is magnified (with respect to FIG. 1, the food roaster is rotated by 180 degrees), according to a preferred embodiment of the invention.

First, referring to FIG. 1 and 2, they are corresponding to a portion of the food roasting apparatus in dissection drawings and the object rotated by 180 degree with locally magnified drawings of dissection. The structure includes a roasting main body 1 and an upholding device 2 that is located at a bottom of the roasting main body 1 and can lift up the roasting main body 1 from one side.

The roasting main body 1 is composed of two symmetrical outer covering plates 10, 11, of which the outer covering plate 10 serves as a base and the outer covering plate 11 serves as an upper cover. The two outer covering plates 10, 11 can be open with respect to each other. When the two outer covering plates 10, 11 are open, the inner part both function as a roasting surface. A heater, preferably an electric heater 100, is formed between the roasting surface and the outer covering plate 10. The roasting surface has at least one protruding rib 110 to serve as plate surface. The adjacent sides of each of the protruding rib 110 on the roasting surface form an oil drainage channel 120 with a relative low position. An oil-collected hole 130 is located on the lowest level of the roasting surface. An oil-collected basin C, with respect to the oil-collected hole 130 is disposed below the oil-collected hole 130, whereby the oil from the drainage channel 120 to the oil-collected hole 130 can be collected in the oil-collected basin C.

Figure 3:
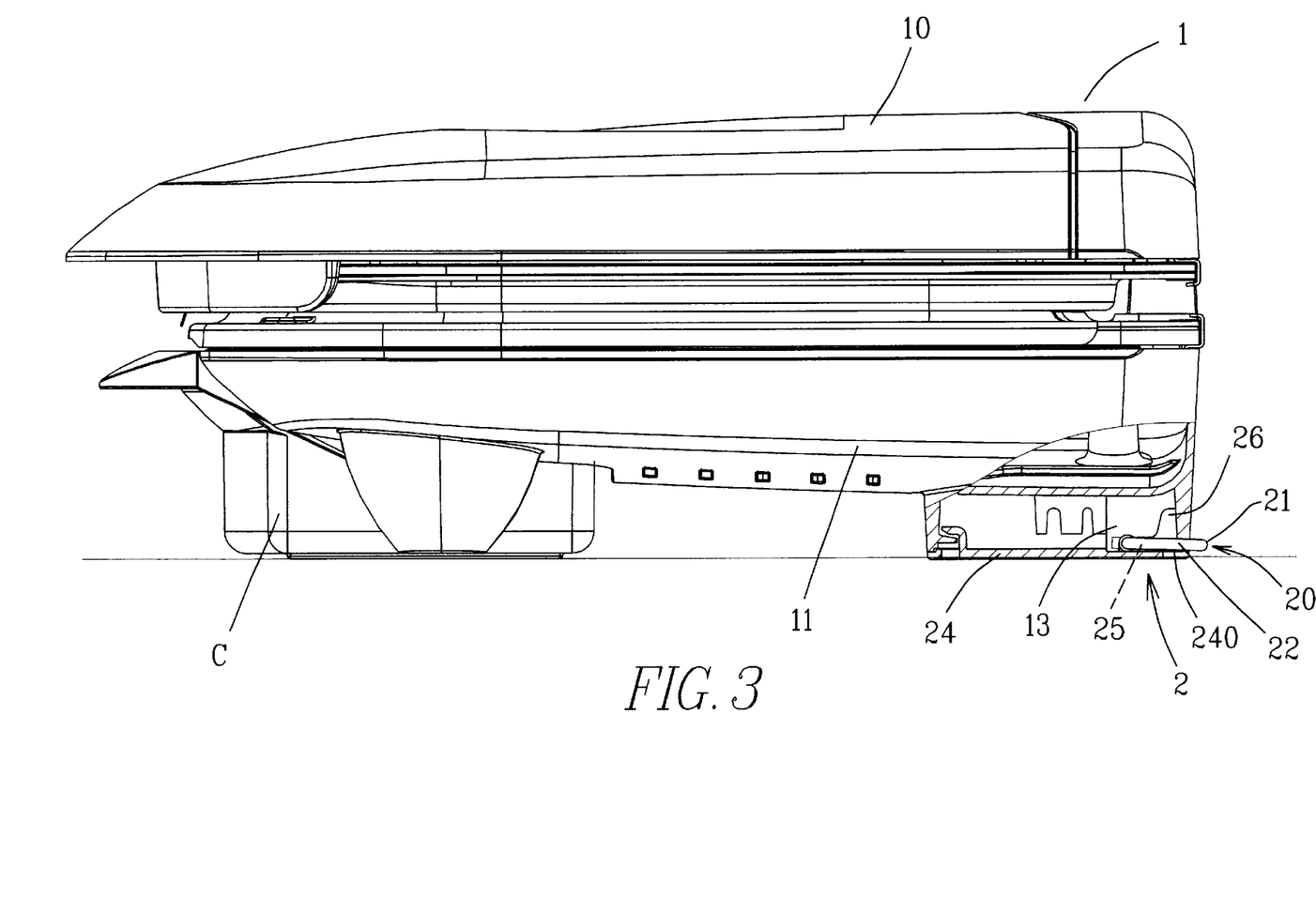
FIG. 3 is a cross-sectional view, schematically showing a portion of the food roasting plate in assembling, according to the preferred embodiment of the invention.
Figure 4:
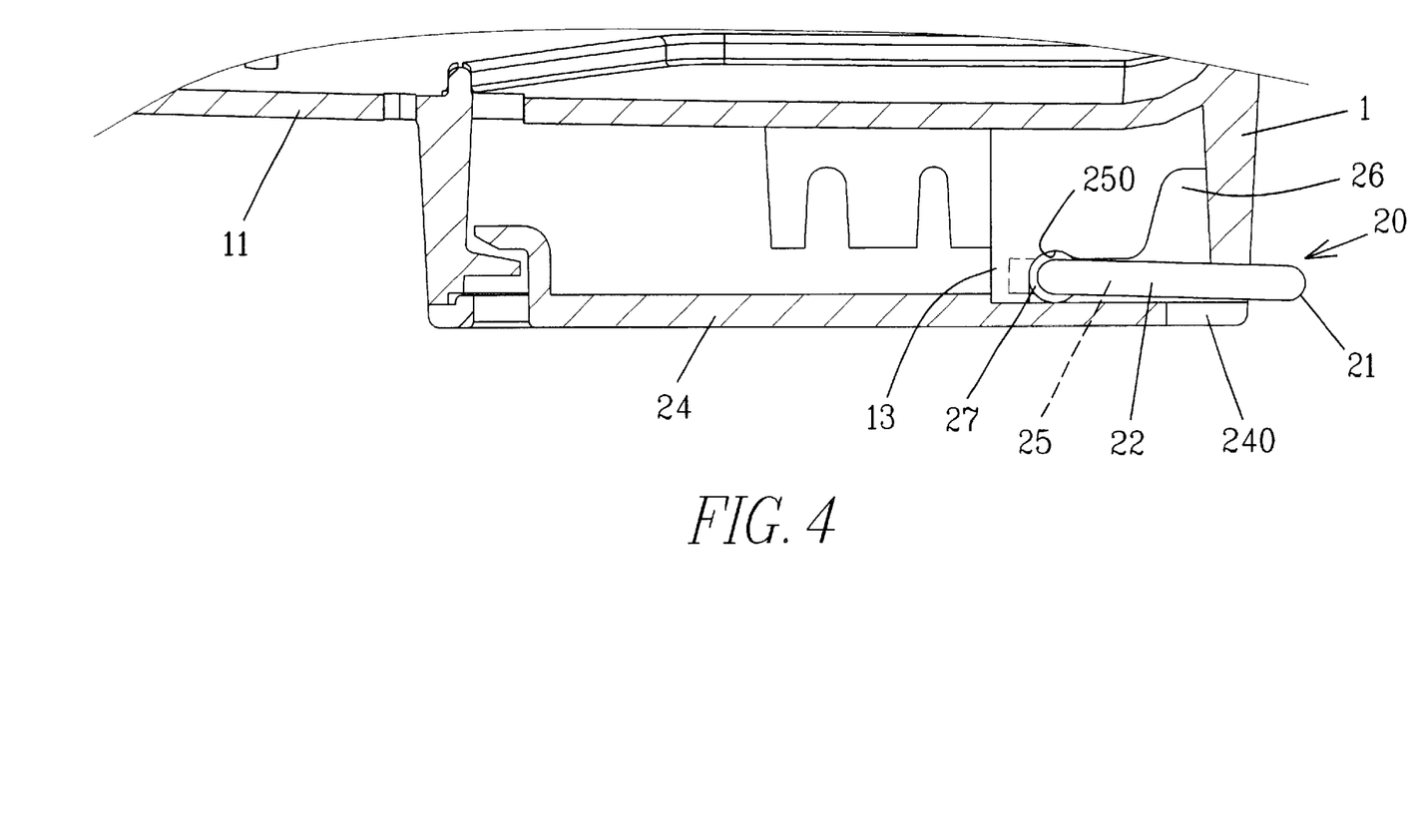
FIG. 4 is a cross-sectional view, schematically showing a portion of the food roasting plate in magnification to further show the assembling, according to the preferred embodiment of the invention.
Figure 5:
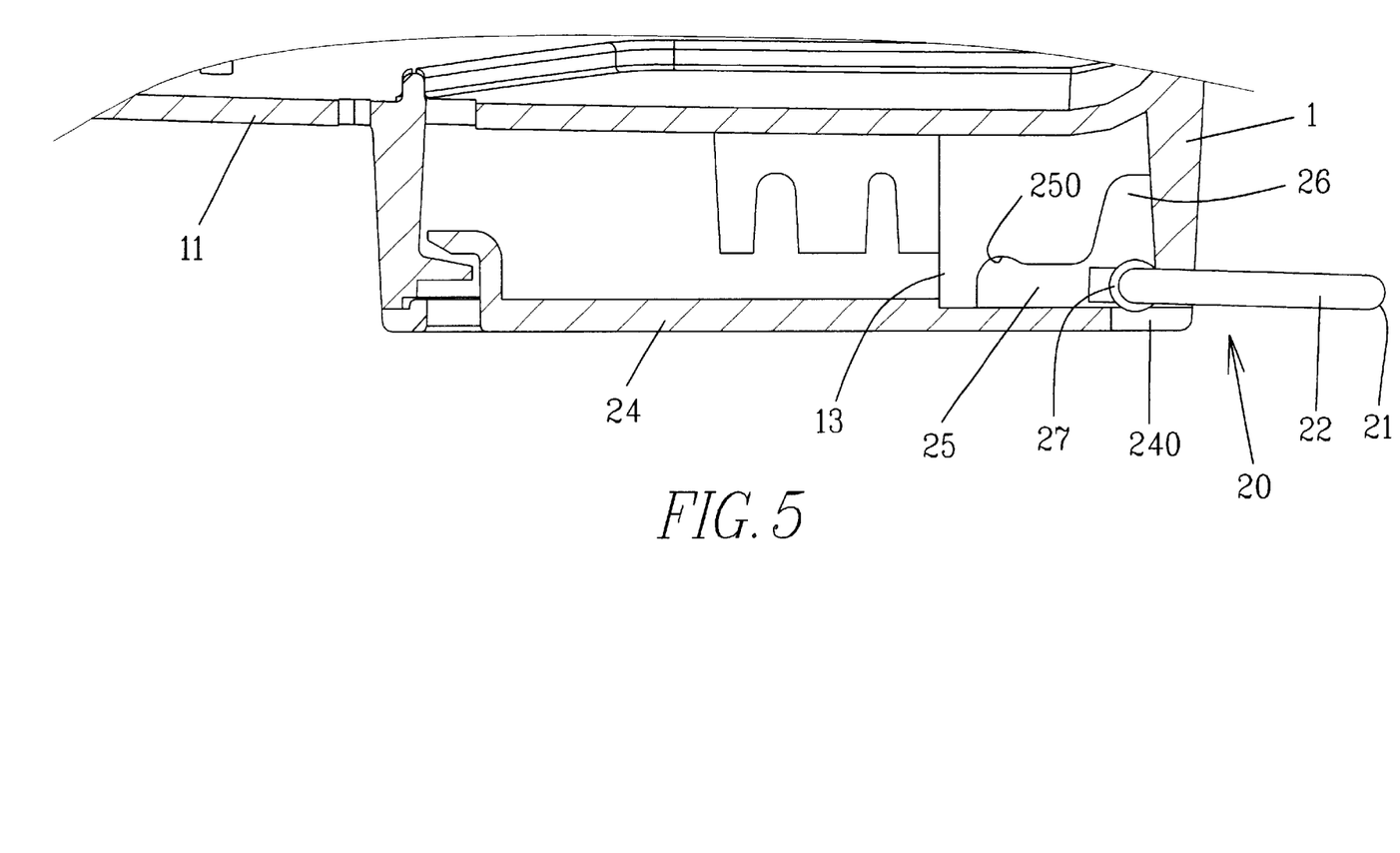
FIG. 5 is a cross-sectional view, schematically showing a portion of the food roasting plate in magnification to further show the operation, according to the preferred embodiment of the invention.
Figure 6:
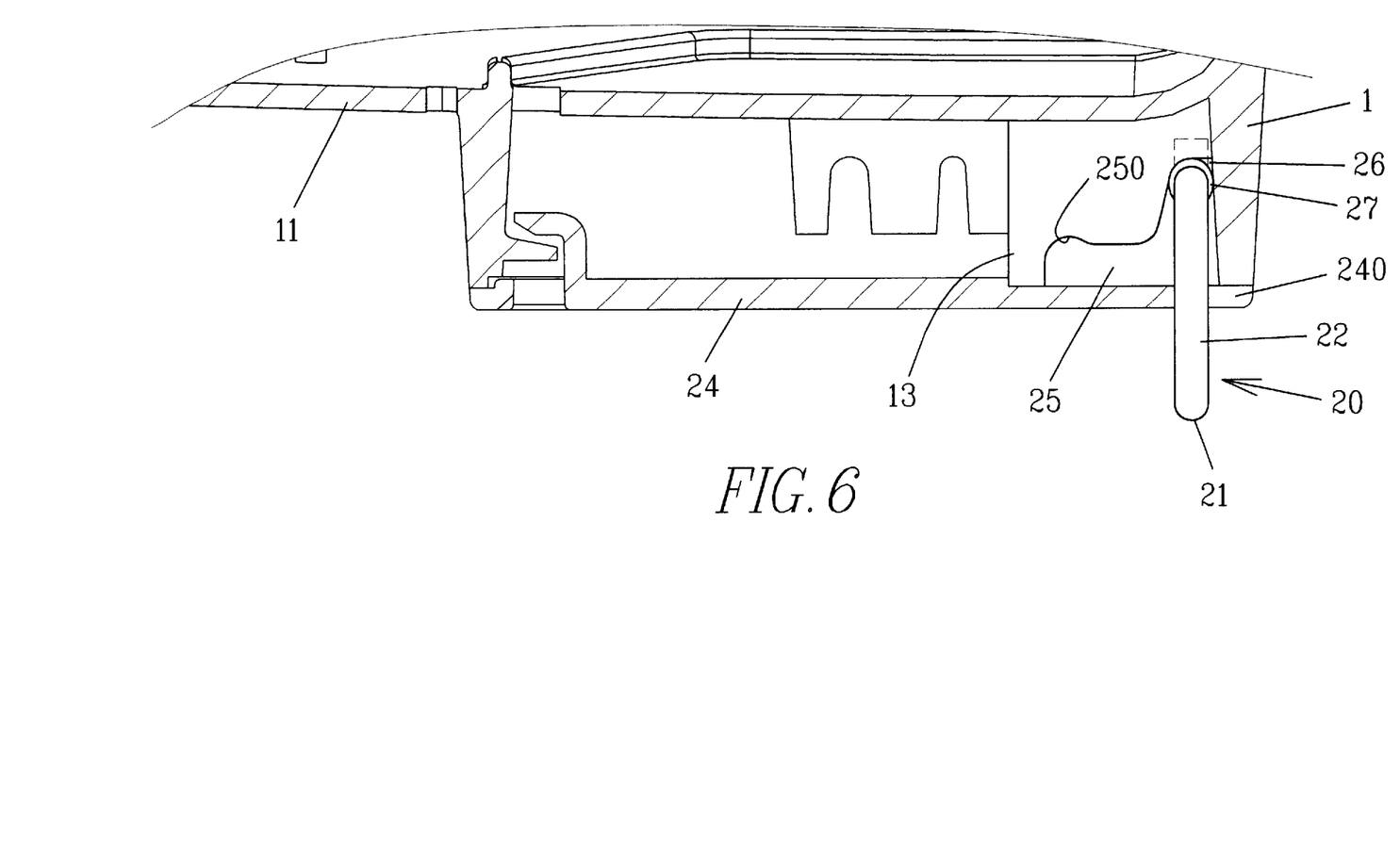
FIG. 6 is a cross-sectional view, schematically showing the structure while an upholding device, according to the preferred embodiment of the invention, holds the roasting plate.
Figure 8:
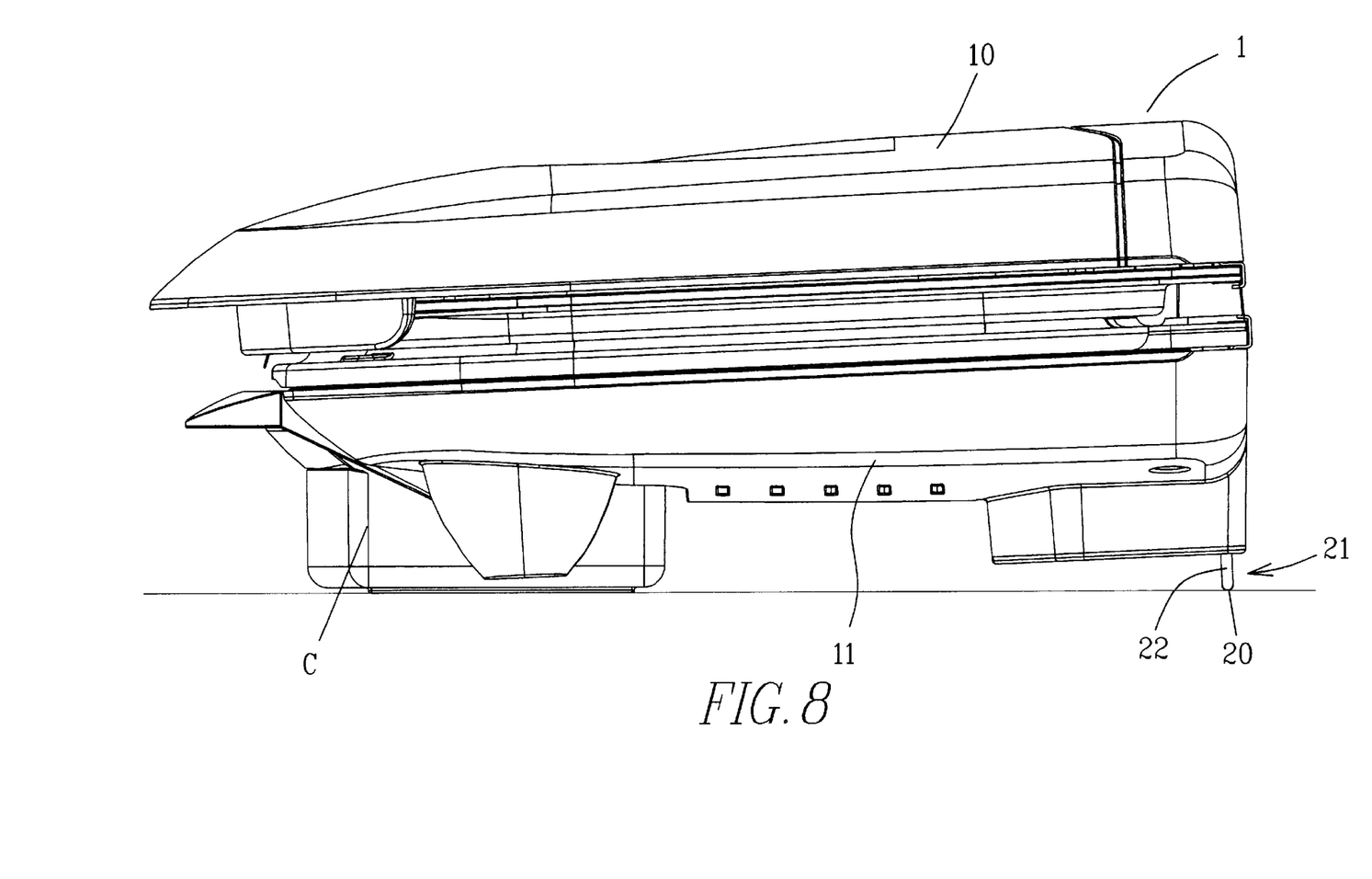
FIG. 8 is a side view, schematically showing the food roasting plate that is lifted up by an upper holding rack, according to another preferred embodiment of the invention.

The upholding device 2 is mounted on the roasting main body at the far end with respect to the oil-collected hole (also referring to FIGS. 3 and 4). The upholding device 2 includes an upholding element 20 and a covering body 24, which can shield the upholding, element 20 and can lock at a bottom of the roasting main body 1. The upholding element 20 has a pulling rod part 21 that is convenient for finger to pull (pulling out) and shift. A predetermined length, so as to form a crossing part 22, bent forwardly two ends of the pulling rod for part 21. With respect to the crossing part 22, an indentation part 12 is formed at the bottom of the roasting main body 1 such that the crossing part 22 can cross over the indentation 12. The covering body 24 also, respectively, has an indentation 240. The end of the crossing part 22 is again inwardly bent to form a stopping part 23, wherein the crossing, part 22 can also be outwardly bent without restriction. With respect to the stopping part 23, the roasting main body 1 has a protruding stopping body 13, providing a stop function for the front ends of the stopping part 23. As a result, the upholding element 20 can be respectively inserted into the roasting main body 1 on the casing through the stopping part 23 and is stop by the protruding stopping body 13, whereby the pulling rod part 21 of the upholding element 20 can always stay outside from the roasting main body 1 through the indentation 12, resulting in an easy pulling as shown in FIGS. 3 and 4. Moreover, the protruding stopping body 13 faces between the front ends of the upholding element 20 and the covering body 24 (also referring to FIG. 4), thereby to separate a suitable gripping stopping space 25, used for the stopping part 23 of the upholding element 20 to be pushed in and established thereon. After the upholding element 20 is pushed in, it has function of affix and containing. Furthermore, there is a groove 26 formed between the outmost end of the gripping stopping space 25 and the casing of the roasting main body 1, so that when the upholding element 20 is pulled out and the stopping part 23 can be studded into the groove 26 by downwardly rotating an angle (also referring to FIGS. 4–6 to show the operation). The pulling rod part 21 of the upholding element 20 (touching onto the indentation 240) can generate a function to stably affix and lift the roasting main body 1 by a single side (referring to FIG. 8). As a result, the oil in the roasting main body 1 can be collected to the oil collection basin C with faster speed. It have been achieved that the oil collection capability is improved by conducting the oil to the collection basin C with a faster speed.

Figure 7:
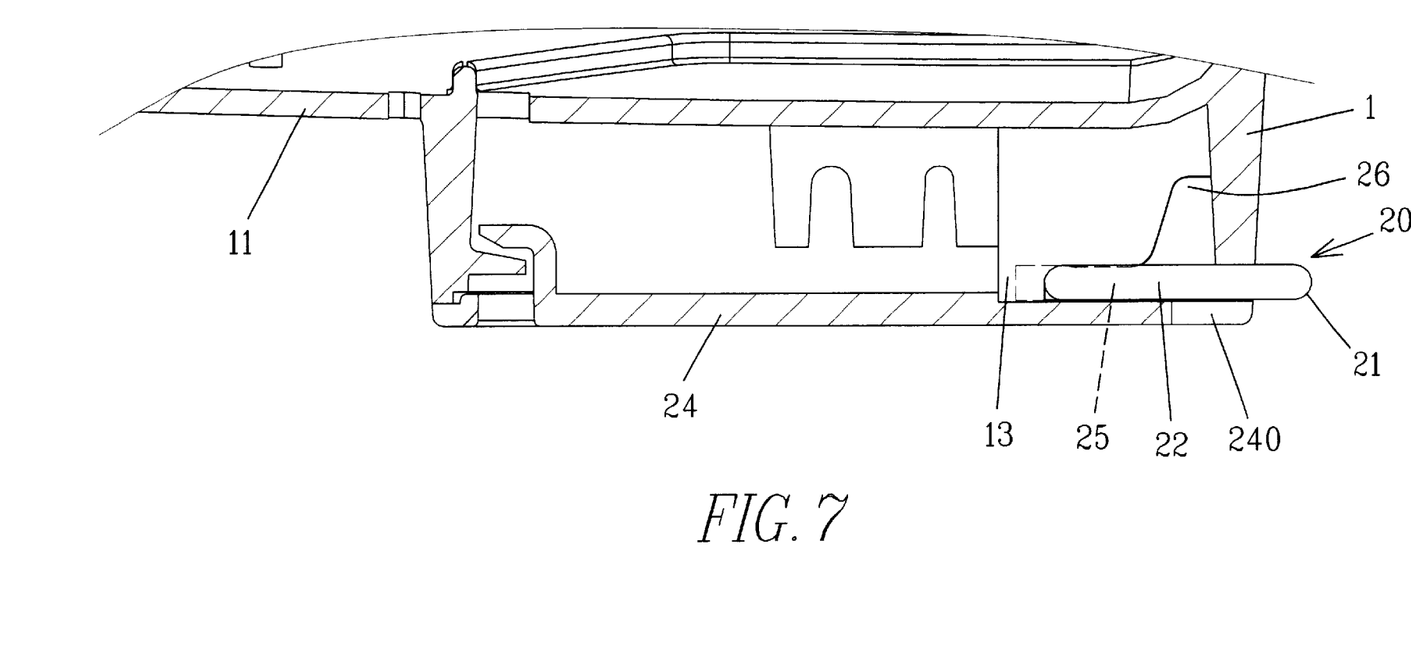
FIG. 7 is a cross-sectional view, schematically showing the food roasting plate when all upper holding device is pushed onto a main body of the roasting plate, according to another preferred embodiment of the invention.

In the forgoing structure of the invention, a silicon flexible ring 27 covers the stopping part of the upholding element 20. Since the flexible ring 27 generates a proper friction in the gripping stop of space 25 while engine is pushing, the effect of affixing is achieved. In this situation, the end of inner side for the gripping space 25 of stopping facing to the flexible ring 27 can be set to have width slightly larger the gripping groove 250, so as to ease the ring 27 for entrance and for establishment (referring to FIG. 4). Of course, we can skip the ring 27 in the invention. It has been sufficient that if the stop of gripping space 25 can allows the stopping part 23 of the upholding element 20 to be pushed in and then produce proper friction resistance, as shown in FIG. 7.

Further still, the design on the pulling rod part 21 of the upholding element 20 can take not only the horizontal rod as drawn in the embodiment, it can also take the wave-like design, so as to have several holding nodes. This is only a design modification of the invention. The invention did not restrict the disclosed design.

According to the foregoing disclosure, when the invention is used in roasting food, the upholding element 20 can be lifted or not to be lifted as desired. When the roasting event accomplishes, the upholding element 20 is lifted, so as to accelerate the collection speed of the oil. As a result, the invention actually improves the oil collection capability with convenience, safe and fast operation. The invention has properties of no obviousness requirement for a patent.

In summary, the present invention has achieved the application in industry. Moreover, the features of the structure of the invention have not been disclosed in publication with satisfying the novelty.

I claim:
1. A food roasting apparatus, comprising:
   a roasting body and an upholding device positioned at a bottom portion of the roasting body and adapted to lift and hold the roasting body at one side thereof;
   the roasting body includes two symmetrical outer covering plates such that when the two outer covering plates are open, an inner surface thereof comprises a roasting surface;
   a heater is positioned between the roasting surface and the outer covering plate;
   the roasting surface include protruding ribs that form a plate surface, adjacent sides of the protruding rib to form an oil drainage channel therebetween;
   an oil-collected hole is located at the roasting surface at a lowest level thereof;
   an oil collection basin, with respect to the oil-collected hole, is disposed below the oil-collected hole, whereby oil flowing from the drainage channel to the oil-collected hole is collected in the oil collection basin;
   the upholding device is mounted on the roasting main body at one end away from the oil-collected hole, the upholding device includes an upholding element and a covering body that shields the upholding element and is locked at a bottom of the roasting main body, the covering body includes an indentation;
   the upholding element has a pulling rod part that is adapted for a finger of a user to pull out and shift;
   two ends of the pulling rod part are forwardly bent to form a crossing part, the end of the crossing part is inwardly bent to form a stopping part, an indentation part is formed at the bottom of the roasting main body;
   the roasting main body has a protruding stopping body that provides a front stop for the stopping part, the protruding stopping body is positioned between front ends of the upholding element of the upholding device and the covering body;
   a groove is formed in a casing at a lower portion of the roasting main body so that when the upholding element is pulled out, the stopping part is studded into the groove by downwardly rotating at an angle such that the pulling rod part of the upholding element stably affixes and lifts the roasting main body to one side thereof; and
   when the upholding element is not used and is retracted, the gripping stopping space contains and positions the upholding element.
2. The roasting apparatus of claim 1, wherein the upholding element is a silicon flexible ring, and the gripping stopping space is permitted to generate a friction resistance for gripping the roasting main body.

* * * * *